(12) United States Patent
Vidal

(10) Patent No.: US 10,627,264 B2
(45) Date of Patent: Apr. 21, 2020

(54) SENSOR MOUNTING SYSTEM FOR A SENSING DEVICE HAVING A COVER THAT MOVES PIVOTALLY RELATIVE TO THE SENSING DEVICE

(71) Applicant: MEAS France, Toulouse (FR)

(72) Inventor: Yannick Vidal, St. Orens de Gameville (FR)

(73) Assignee: MEAS FRANCE, Toulouse (FR)

( * ) Notice: Subject to any disclaimer, the term of this patent is extended or adjusted under 35 U.S.C. 154(b) by 251 days.

(21) Appl. No.: 15/669,237

(22) Filed: Aug. 4, 2017

(65) Prior Publication Data
US 2018/0038717 A1 Feb. 8, 2018

(30) Foreign Application Priority Data

Aug. 5, 2016 (EP) .................................. 16306024

(51) Int. Cl.
| | |
|---|---|
| *G01D 11/30* | (2006.01) |
| *G01D 11/24* | (2006.01) |
| *B60R 11/00* | (2006.01) |
| *B60S 1/08* | (2006.01) |

(52) U.S. Cl.
CPC .............. *G01D 11/30* (2013.01); *B60R 11/00* (2013.01); *G01D 11/245* (2013.01); *B60R 2011/0026* (2013.01); *B60R 2011/0063* (2013.01); *B60R 2011/0071* (2013.01); *B60S 1/0888* (2013.01)

(58) Field of Classification Search
CPC ...... G01D 11/245; G01D 11/20; G01L 19/14; G01J 5/04; G01P 1/02; G01K 11/004; G01K 11/006; G01K 11/008; B60S 1/0818–0892; B60S 1/0881; B60S 1/0888; B60R 2011/0026; B60R 2011/0005; B60R 2011/0078; B60R 2011/0071

USPC ................. 73/431, 866.5; 248/316.4–316.5, 248/229.1–229.26, 220.21–231.91, 503
See application file for complete search history.

(56) References Cited

U.S. PATENT DOCUMENTS 4,871,917 A * 10/1989 O'Farrell .............. B60S 1/0822
                                                            250/341.7
5,461,915 A * 10/1995 Heyler ................... G01D 11/24
                                                            73/431

(Continued)

FOREIGN PATENT DOCUMENTS

| EP | 2407350 A2 | 1/2012 |
| WO | 2007101787 A2 | 9/2007 |

OTHER PUBLICATIONS

European Search Report, dated Jan. 17, 2016, 8 pages.

*Primary Examiner* — Lisa M Caputo
*Assistant Examiner* — Tran M. Tran

(57) ABSTRACT

A sensor mounting system for mounting onto a sensor mounting bracket a sensing device and a cover that covers the sensing device. The sensing device is mounted onto the sensor mounting bracket by sliding from a sensing device delivery position to a sensing device mounted position. The cover pivots relative to the sensing device from a cover delivery position to a cover locked position. When the sensing device is mounted onto the sensor mounting bracket, the cover is in the cover delivery position and contacts the sensor mounting bracket such that by pivoting the cover towards the cover locked position, the cover causes sliding of the sensing device into the sensing device mounted position.

20 Claims, 5 Drawing Sheets

(56) References Cited

U.S. PATENT DOCUMENTS

| | | | | |
|---|---|---|---|---|
| 5,832,082 A * | 11/1998 | Nagai | B60R 11/0241 | 379/449 |
| 5,950,973 A * | 9/1999 | Verma | B60R 11/00 | 248/222.51 |
| 6,147,753 A * | 11/2000 | Koyama | B60S 1/0822 | 356/237.3 |
| 6,894,619 B1 * | 5/2005 | Schmitt | B60S 1/0822 | 219/209 |
| 6,935,062 B2 * | 8/2005 | Lowry | G03B 21/00 | 248/205.1 |
| 7,415,891 B2 * | 8/2008 | Santos | H02B 1/048 | 73/855 |
| 7,468,523 B2 * | 12/2008 | Ishikawa | B60S 1/0822 | 250/573 |
| 7,658,101 B2 * | 2/2010 | Gotoh | B60S 1/0822 | 73/170.17 |
| 7,705,338 B2 * | 4/2010 | Ishikawa | B60S 1/0822 | 250/573 |
| 7,747,009 B2 * | 6/2010 | Cullman | B60R 11/0241 | 379/446 |
| 7,780,137 B2 * | 8/2010 | Hansel | B60S 1/0881 | 248/346.01 |
| 7,911,356 B2 * | 3/2011 | Wohlfahrt | B60S 1/0881 | 248/674 |
| 7,942,474 B2 * | 5/2011 | Jones | B60R 11/0264 | 180/90 |
| 8,162,518 B2 * | 4/2012 | Schofield | B60Q 1/1423 | 362/466 |
| 8,210,037 B2 * | 7/2012 | Christoph | G01D 11/30 | 73/431 |
| 8,339,453 B2 * | 12/2012 | Blake, III | B60R 11/00 | 348/148 |
| 8,356,948 B2 * | 1/2013 | Onishi | B60R 11/04 | 396/419 |
| 8,405,726 B2 * | 3/2013 | Schofield | B60R 1/04 | 348/148 |
| 8,448,914 B2 * | 5/2013 | Roehr | B60S 1/0881 | 248/681 |
| 8,456,311 B2 * | 6/2013 | Wohlfahrt | B60S 1/0822 | 248/309.1 |
| 8,585,315 B2 * | 11/2013 | Van Kuijk | F16M 11/041 | 248/222.51 |
| 8,636,393 B2 * | 1/2014 | Schofield | B60Q 1/1423 | 362/466 |
| 8,754,774 B2 * | 6/2014 | Wohlfahrt | B60S 1/0822 | 248/309.1 |
| 8,763,970 B2 * | 7/2014 | Mordau | B60S 1/0822 | 248/300 |
| 8,925,891 B2 * | 1/2015 | Van Huis | B60R 11/04 | 248/475.1 |
| 9,225,884 B2 * | 12/2015 | Blake, III | B60R 11/00 | |
| 9,487,156 B2 * | 11/2016 | Frenzel | B60R 11/04 | |
| 9,849,840 B2 * | 12/2017 | Okitsu | B60R 11/00 | |
| 9,908,481 B2 * | 3/2018 | Hayashi | B60R 11/04 | |
| 10,139,707 B2 * | 11/2018 | Carlson | G03B 17/561 | |
| 10,252,684 B2 * | 4/2019 | Miyado | B60R 11/04 | |
| 10,288,986 B2 * | 5/2019 | Blake, III | G03B 17/55 | |
| 2001/0018847 A1 | 9/2001 | Lynam | | |
| 2007/0205348 A1 * | 9/2007 | Schmitt | B60S 1/0822 | 248/503 |
| 2010/0065707 A1 * | 3/2010 | Hansel | B60R 11/04 | 248/298.1 |
| 2010/0308094 A1 | 12/2010 | Stegmann et al. | | |
| 2011/0233248 A1 * | 9/2011 | Flemming | B60R 11/00 | 224/482 |
| 2016/0285200 A1 * | 9/2016 | Eow | H01R 13/62938 | |
| 2018/0065571 A1 * | 3/2018 | Hart | H04N 5/2251 | |

\* cited by examiner

SENSOR MOUNTING SYSTEM FOR A SENSING DEVICE HAVING A COVER THAT MOVES PIVOTALLY RELATIVE TO THE SENSING DEVICE

CROSS-REFERENCE TO RELATED APPLICATIONS

This application claims the benefit of the filing date under 35 U.S.C. § 119 (a)-(d) of European Patent Office Patent 16306024.7, filed Aug. 5, 2016.

FIELD OF THE INVENTION

The present invention relates to a sensor mounting system comprising a sensing device and a cover to be mounted on a vehicle sensor mounting bracket provided on an inside surface of a vehicle windshield.

BACKGROUND

In the automotive industry, it is known to attach different types of sensors, including multifunction sensors, to inside or outside surfaces of a motor vehicle. For instance, temperature and/or humidity sensors can be attached to an inside surface of the vehicle windshield. Furthermore, different mounting methods are known depending on the type of sensor and/or mounting surface.

A sensor module which can be connected, via a fastening section arranged thereon, to an element that is fixed to a vehicle windshield is known for instance from published patent application US 2010/0308094 A1.

A rain sensor module assembly mounted to the inner surface of a vehicle windshield by a rain sensor mounting button adhered to the inner surface of the windshield by a layer of adhesive is known for instance from published patent application US 2001/0018847 A1.

In some cases, sensors are attached via a customer sensor mounting bracket glued to an inside surface of a vehicle windshield, typically behind the cabin rear-view mirror. This is the case for instance for defogging sensor systems, which typically combine a relative humidity sensor and an ambient/windshield temperature sensor, wherein the temperature sensor needs to be placed in contact with the inside surface of the windshield. Once the defogging sensor system is mounted onto the customer sensor mounting bracket, a customer cover allowing air flow circulation is then mounted thereon to protect the sensor.

Thus, in cases where a customer sensor mounting bracket is imposed, connectivity providers need to adapt sensor mounting systems to the customer's (e.g., the car manufacturer) vehicle sensor mounting brackets.

SUMMARY

A sensor mounting system for mounting a sensor to a sensor mounting bracket, constructed in accordance with the present invention, includes a sensing device for positioning on the sensor mounting bracket to slide from a sensing device delivery position to a sensing device mounted position. This sensor mounting system also includes a cover that covers the sensing device and is mounted on the sensing device for pivotal movement relative to the sensing device from a cover delivery position to a cover locked position. The cover also is in contact with the sensing device when pivoting from the cover delivery position to the cover locked position, thereby causing the sensing device to slide from the sensing device delivery position to the sensing device mounted position. The cover is in contact with the sensor mounting bracket when moved pivotally to the cover locked position.

BRIEF DESCRIPTION OF THE DRAWINGS

The invention will be described in more detail in the following, based on advantageous embodiments described in combination with the accompanying figures, wherein.

In the following, the present invention will be illustrated in the context of the automotive industry, and in particular of a defogging sensor system 1 to be mounted onto a predetermined mounting bracket 4 supplied by a customer such as a car manufacturer and to be attached to an inside surface of a motor vehicle windshield 5. It should however be noted that the present invention could also be applied to a different context, i.e. to a different type of sensor and/or a different application provided that a sensor needs to be mounted onto a predetermined customer sensor mounting bracket to be attached to a predetermined surface.

DETAILED DESCRIPTION OF THE EMBODIMENT(S)

Figure 1:
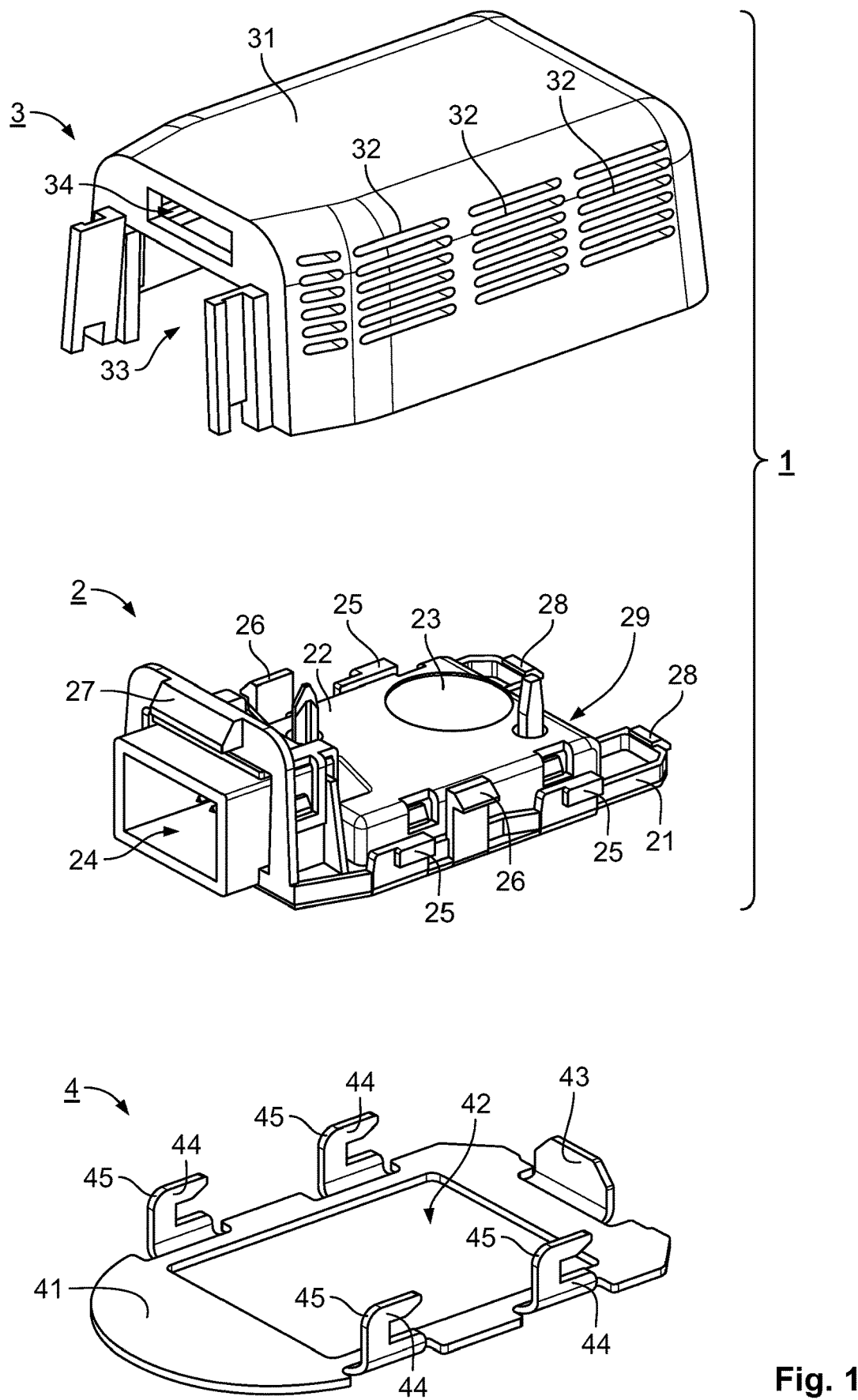
FIG. 1 illustrates an example of a customer vehicle sensor mounting bracket to be attached to a vehicle surface and an example of a sensor mounting system according to an embodiment of the present invention, in an exploded 3-D view.

Typically, a sensor mounting bracket can be a rigid piece, for instance made of a metal or metallic alloy, which will be attached to the surface of an environment in which a sensor needs to be installed. FIG. 1 illustrates an example of a vehicle sensor mounting bracket 4, in short a mounting bracket, provided, for instance, by a car manufacturer to be used for mounting a sensor, such as a defogging sensor on the windshield of a motor vehicle.

As shown in FIG. 1, the vehicle sensor mounting bracket 4 comprises a body 41, which can be substantially flat so as to be attached to a flat surface of a vehicle, in this example the inside surface of a vehicle windshield, namely the windshield side towards the vehicle cabin, as opposed to the outside surface of the vehicle windshield, which is the windshield side towards the exterior of the vehicle. As also illustrated, the mounting bracket body 41 can define a frame around an opening or sensor accommodation space 42 for receiving a sensor to be placed in contact with the inside surface of the vehicle windshield. In FIG. 1, the sensor accommodation space 42 and, therefore, also the mounting bracket body 41 are substantially rectangular. However, other customer-made sensor mounting brackets could have different geometries.

Further, the vehicle sensor mounting bracket 4 illustrated in FIG. 1 comprises a stop 43 at one of its extremities, which extends away from one of its shorter sides. In addition, the vehicle sensor mounting bracket 4 comprises at least one C-shaped bracket 44. In FIG. 1, four C-shaped brackets 44 are arranged in pairs on the longer sides of the mounting bracket body 41, with their back sides 45 facing away from the extremity comprising the stop 43. As also illustrated, the brackets 44 extend away from the mounting bracket body 41 in the same direction as stop 43, namely in a direction substantially perpendicular to the plane defined by the mounting bracket body 41. Thus, when the vehicle sensor mounting bracket 4 is attached, for instance glued, to the inside surface of a vehicle windshield, the stop 43 and the brackets 44 extend away from the vehicle windshield towards the inside of the vehicle cabin.

According to an embodiment of the present invention, the sensor mounting system 1 illustrated in FIG. 1 can be provided in order to attach a sensing device 2 to the vehicle sensor mounting bracket 4 in order to respond to the customer's request. As can be seen from the exploded perspective view of FIG. 1, the sensor mounting system 1 also comprises a cover 3 and, therefore, forms a sensor and cover package.

In the following, some structural features of the sensor mounting system 1 will be detailed with reference to FIG. 1 and the mounting kinematics of the sensor mounting system 1, according to the present embodiment of the invention, will be described thereafter with reference to FIGS. 2A, 2B, 3A, 3B, 4A, 4B, 5A, and 5B.

As can be seen from FIG. 1, the sensing device 2 can comprise a sensing device body 21, which can, in turn, comprise means for attaching the same to a sensor mounting bracket, here the customer-made vehicle sensor mounting bracket 4. In order to protect any electronic equipment, in particular one or more sensors, the sensing device 2 can also comprise a hood 22 under which the electronics (e.g., sensors, electronic cards, and the like) can be mounted, as well as a connector part 24 for allowing a connection to the electronics. As further illustrated, the sensing device body 21 can have a geometry adapted to that of the vehicle sensor mounting bracket 4. In particular, the sensing device body 21 can comprise a recess 29, which can be used as an abutment element against the stop 43 when placing the sensing device 2 on the vehicle sensor mounting bracket 4.

In this embodiment, the sensing device 2 can be a multifunction sensor such as a defogging sensor. The sensing device 2 can, therefore, comprise one or more sensors mounted under the hood 22, such as a temperature sensor for measuring a windshield temperature, and/or a relative humidity sensor, and/or an ambient temperature sensor (not illustrated). In addition, in embodiments with a relative humidity sensor and/or an ambient temperature sensor, the hood 22 can also comprise a filter 23 over the sensors. As mentioned above, it should be clear that other sensors could be used in other embodiments and/or contexts. In any case, since the sensing device 2 is configured to be mounted onto the vehicle sensor mounting bracket 4, it is adapted such that at least some of its onboard sensors, in particular the windshield temperature sensor, will be mounted in the sensor accommodation space 42, if applicable in order to contact the inside surface of the vehicle windshield. Furthermore, depending on the type of electronics integrated in the sensing device 2, the hood 22 and/or the filter 23 may not be necessary.

Furthermore, the sensing device 2 is configured for being mounted onto the vehicle sensor mounting bracket 4, in particular by sliding from a sensing device delivery position to a sensing device mounted position. Thus, the sensing device 2 can comprise various means for mounting the same onto the vehicle sensor mounting bracket 4. In particular, the sensing device 2 can comprise at least one mounting leg 25 adapted for being slidably mounted in one of the C-shaped brackets 44. In the present embodiment, the sensing device 2 can therefore comprise at least one mounting leg 25 arranged on a longitudinal side of the sensing device body 21. Although only one mounting leg 25 could be sufficient for maintaining the sensing device 2 the vehicle sensor mounting bracket 4, the sensing device 2 can preferably comprise as many mounting legs 25 as the vehicle sensor mounting bracket 4 comprises brackets 44 or mounting/support elements. Therefore, in the present embodiment of the sensing device 2 it can comprise four mounting legs 25 arranged in pairs and extending laterally on each longitudinal side of the sensing device body 21.

As can be seen from FIG. 1, the cover 3 can comprise a cover body 31, which can essentially be a hood to be placed on the sensing device 2. In this embodiment, since the sensing device 2 can be a defogging sensor, the cover body 31 can comprise one or more air inlets 32, which allow air circulation between the vehicle cabin and the sensing device 2, while still protecting the electronics of the sensing device 2 from unintentional contacts. In addition, since the sensing device 2 comprises a connector part 24, an extremity of the cover body 31 can form an opening 33 for accommodating the connector part 24.

Furthermore, as will be explained in further detail hereinafter, the cover 3 is configured for being mounted on the sensing device 2 and, in particular, for pivoting relative thereto from a cover delivery position to a cover locked position. In other words, the cover 3 is configured such that it can be tipped from its cover delivery position towards its cover locked position.

The tipping or pivoting of the cover 3 relative to the sensing device 2 can be realized by means of a hinge, a pivot point, a tipping point or the like. For this purpose, in the present embodiment, a first extremity of the sensing device 2 can comprise one or more first sensing device attaching or locking means 28, for instance locking tabs, and a corresponding first extremity of the cover 3 can comprise, respectively, one or more first cover attaching or locking means 37, for instance complementary locking tabs, thereby forming corresponding pivot points when the cover 3 is mounted with the sensing device 2, as will become clear with the mounting kinematics described with reference to FIGS. 2A, 2B, 3A, 3B, 4A, 4B, 5A, and 5B. As illustrated in the figures, in the present embodiment, two pivot points can be formed by the first sensing device and cover locking means 28, 37 on either side of the recess 29 of the sensing device body 21.

In addition, in order to lock the cover 3 with the sensing device 2 upon tipping or pivoting the cover 3 into its cover locked position, further locking members can be provided. In the present embodiment, as illustrated in FIG. 1, a second extremity of the sensing device 2 can comprise second sensing device locking means 27 and the corresponding extremity of the cover 3 can comprise respective second cover locking means 34. While the second sensing device and cover locking means 27, 34 could be provided on the longitudinal edges of the sensing device 2 and of the cover 3, in this embodiment they can preferably be provided on a respective extremity of the sensing device 2 and of the cover 3 that is opposite the first extremity realizing at least one pivot point. As also illustrated in FIG. 1, in the present embodiment, the second sensing device locking means 27 can be a locking tab in the shape of an angled protrusion above the connector part 24 that snap fits with a slit forming the second cover locking means 34 above the opening 33 provided on the cover body 31.

Figure 2A:
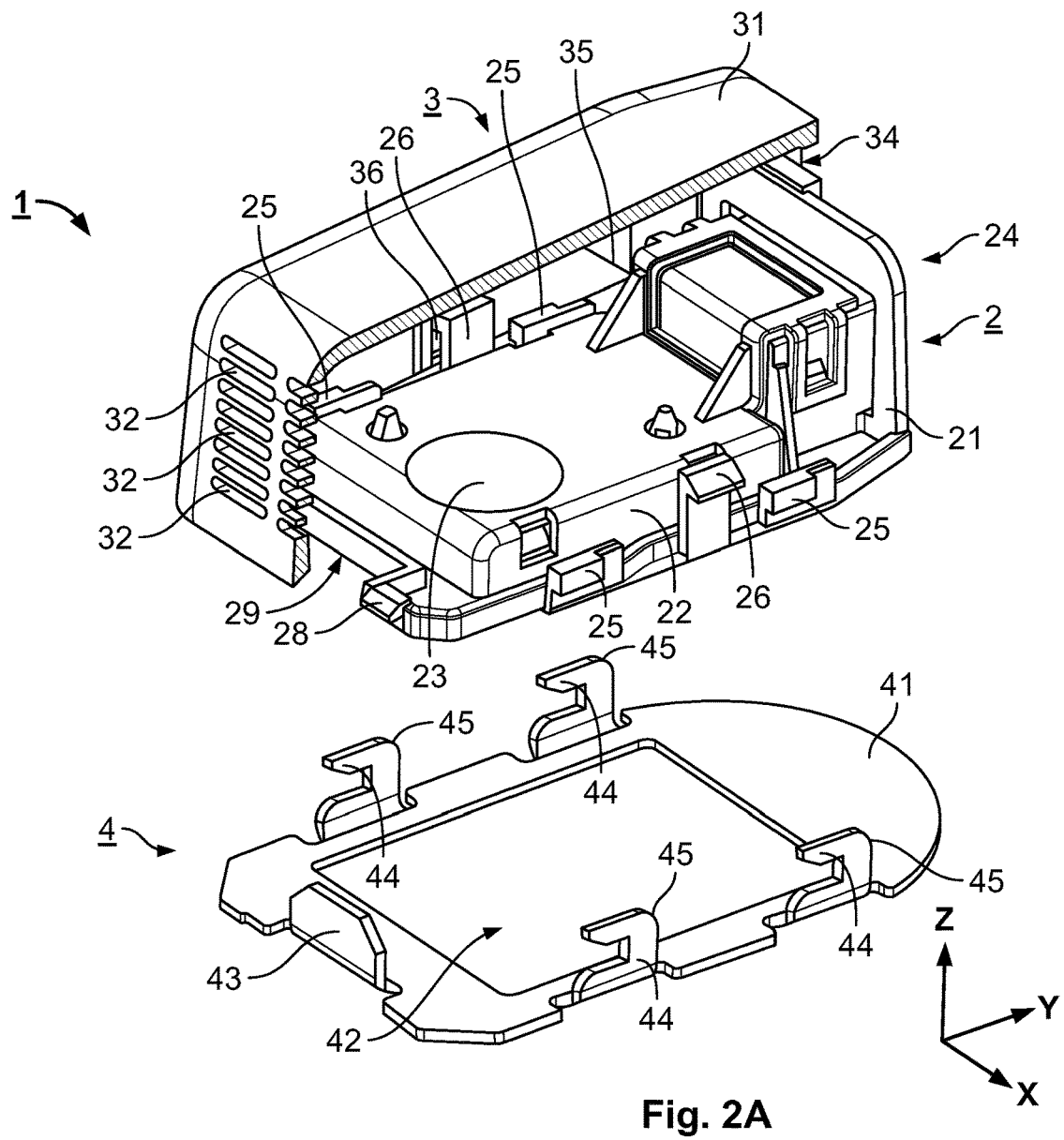
FIGS. 2A and 2B illustrate a step of the mounting kinematics of the exemplary sensor mounting system according to the present invention onto the customer vehicle sensor mounting bracket, both in a 3-D view (FIG. 2A) and in a simplified schematic cross-sectional view (FIG. 2B)

Furthermore, the sensor mounting system 1 can advantageously be configured to avoid unintentional disengagement of the sensor and cover package formed by the sensing device 2 and the cover 3 when they are mounted together (as illustrated for instance in FIG. 2A). In the present embodiment, this can be achieved by providing third sensing device locking means or sensing device retention means 26 on the sensing device 2 and corresponding third cover locking means or cover retention means 36 (see FIGS. 2A, 3A, 4A, and 5A). While the third sensing device and cover locking means 26, 36 could be provided in another manner, in this embodiment it can preferably be provided on the longitudinal edges of the sensing device 2 and of the cover 3 and more preferably towards middle portions thereof. In particular, FIG. 1 illustrates that the sensing device body 21 comprises two third sensing device locking means 26, for instance locking lances or locking tabs, arranged each on a middle portion of a respective longitudinal side of the sensing device body 21, in particular between the two mounting legs 25. In turn, a middle portion of the inside of each of the corresponding longitudinal walls of the cover body 31 is provided with a corresponding third cover locking means 36, for instance in the shape of a recess, in which each third sensing device locking means 26 snap fits upon mounting the cover 3 on the sensing device 2 and which prevents unexpected removal of the cover 3 (as illustrated for instance in FIG. 2B).

In the following, in order to explain the mounting kinematics of the sensor mounting system 1 onto the vehicle sensor mounting bracket 4 attached to the inside surface of a vehicle windshield 5, steps of the mounting kinematics will be explained both with reference to perspective views (FIGS. 2A, 3A, 4A and 5A) and with reference to corresponding simplified schematic cross-sectional views (FIGS. 2B, 3B, 4B and 5B). In the various views, the X axis can be used to refer to the direction defined by the shorter sides of the sensing device 2, of the cover 3, and of the vehicle sensor mounting bracket 4, and the Y axis can be used to refer to the direction defined by the longer sides of the sensing device 2, of the cover 3, and of the vehicle sensor mounting bracket 4. Accordingly, the Z axis can be used to refer to the direction perpendicular to the plane defined by the X and Y axes. In other words, the X and Y axes can also be used to refer to the planes defined by the surface of the vehicle windshield 5, or by the mounting bracket body 41, and the Z axis can also be used to refer to a placement direction along which the sensor mounting system 1 will be brought into place on the vehicle sensor mounting bracket 4, in particular on the mounting bracket body 41.

An initial step of the mounting kinematics will now be described with reference to FIGS. 2A and 2B. In this embodiment, the vehicle sensor mounting bracket 4 has been attached, for instance glued, to the inside surface of a vehicle windshield 5. Typically, for an application relating to a defogging sensor, this may be done behind the cabin rear-view mirror. According to the present invention, the sensor mounting system 1 is provided and will be mounted onto the vehicle sensor mounting bracket 4. In particular, the sensor mounting system 1 will be placed with the bottom part of the sensing device body 21 flat against the mounting bracket body 41. In other words, the sensor mounting system 1 will be brought towards the vehicle sensor mounting bracket 4 in a translation movement following a placement direction D1 along the Z axis.

Figure 2B:
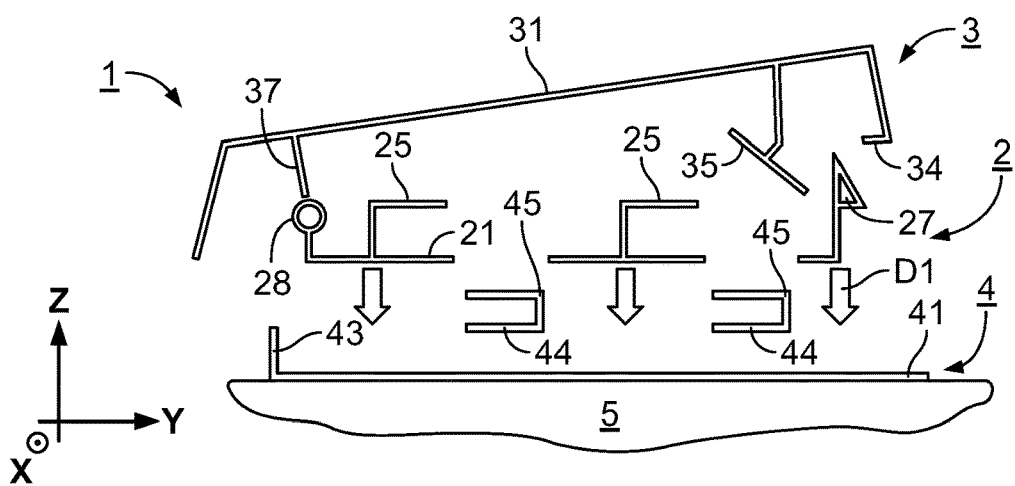

In FIGS. 2A and 2B, the cover 3 is illustrated assembled to the sensing device 2 in a cover delivery position. In this embodiment, in the cover delivery position, the complementary first sensing device and cover locking means 28, 37 can form pivot points, the third sensing device locking means 26 can be snap fit it in the complementary third cover locking means 36 and can move along the Z axis, but the complementary second sensing device and cover locking means 27, 34 are not engaged with one another. A relative displacement of the cover 3 with respect to the sensing device 2 along the X axis is prevented.

A subsequent step of the mounting kinematics will now be described with reference to FIGS. 3A and 3B, wherein the sensor mounting system 1 is now placed in its delivery position on the vehicle sensor mounting bracket 4. In particular, the cover 3 is still in the cover delivery position. The sensing device 2 has been placed in a sensing device delivery position, and rests in particular on the mounting bracket body 41 with the recess 29 in abutment against the stop 43 so as to limit a displacement of the sensor mounting system 1 at least in one direction of the Y axis.

Here, the cover 3, which is still in its delivery position as mentioned above, also rests at least partially on the vehicle sensor mounting bracket 4. By pivoting or tipping the cover 3 along a tipping direction D2 towards the vehicle windshield 5, the cover 3 will start exerting a pressure against the vehicle sensor mounting bracket 4, such that the sensor mounting system 1, and in particular the sensing device 2, will start sliding with respect to the vehicle sensor mounting bracket 4.

Figure 3A:
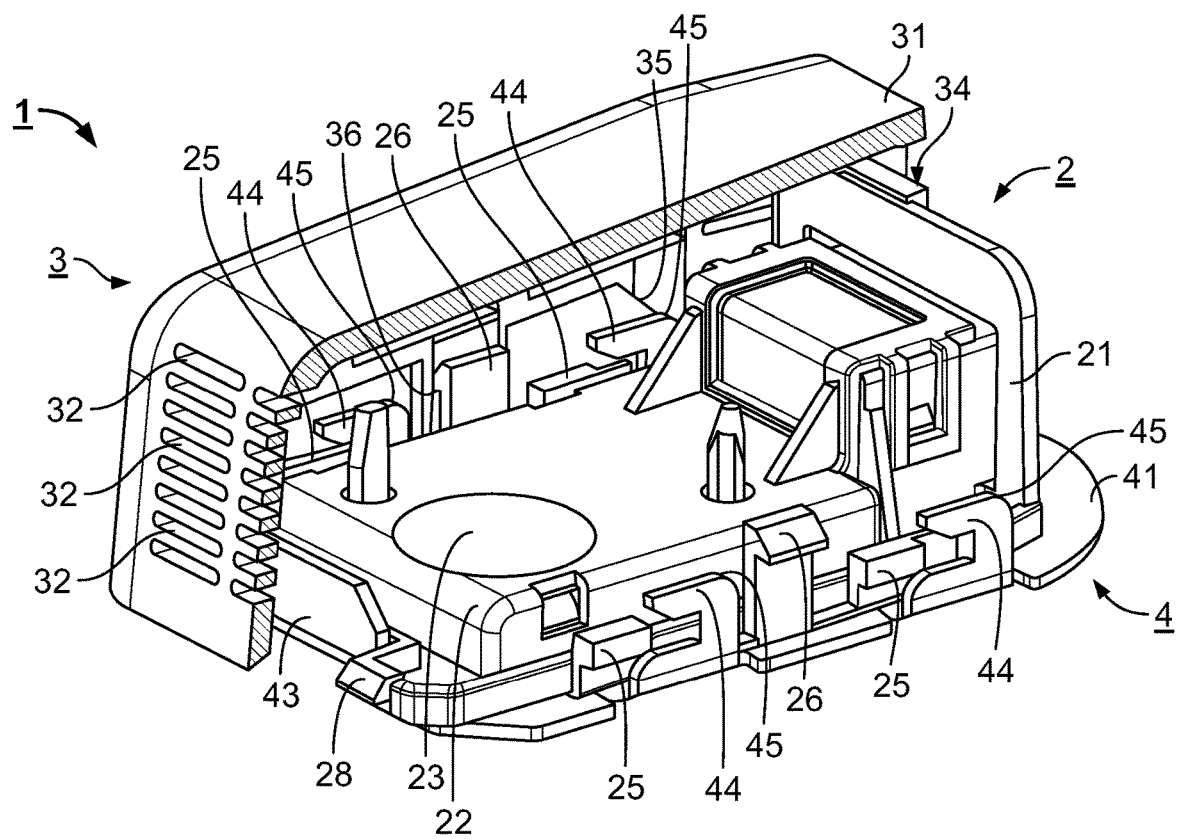
FIGS. 3A and 3B illustrate a subsequent step of the mounting kinematics of the exemplary sensor mounting system according to the present invention onto the customer vehicle sensor mounting bracket, both in a 3-D view (FIG. 3A) and in a simplified schematic cross-sectional view (FIG. 3B)
Figure 3B:
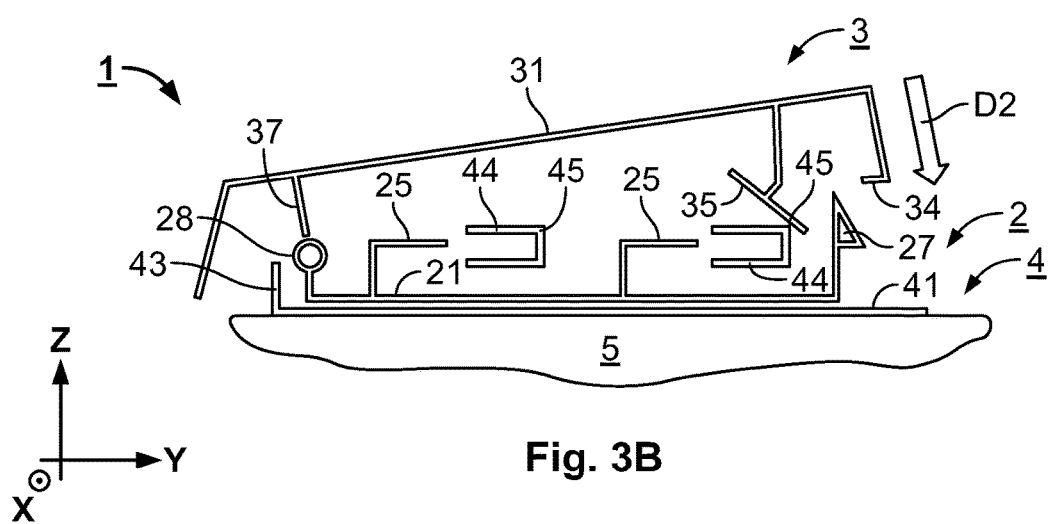

As illustrated in FIGS. 3A and 3B, one way to realize the above-mentioned effect can be to provide at least one guiding surface 35 in or on the cover 3, and to configure the sensor mounting system 1 such that said guiding surface 35 can be brought into contact with a contact surface of the vehicle sensor mounting bracket 4 onto which a pressure can be exerted. In the present embodiment, a guiding surface 35 could be provided on the inside of at least one of the longitudinal walls of the cover body 31. For better guidance and pressure distribution, it could however be preferable to provide a guiding surface 35 on the inside of each of the longitudinal walls of the cover body 31. Further, the one or more guiding surfaces 35 can be arranged such that they contact a part of the vehicle sensor mounting bracket 4 which can support a certain pressure. In the present embodiment, the sensor mounting system 1 is configured such that the guiding surfaces 35 contact a respective backside 45 of a C-shaped bracket 44. While a guiding surface 35 could be arranged for contacting the backside 45 of any of the C-shaped brackets 44, arranging the guiding surfaces 35 so as to contact the respective backside 45 of the two C-shaped brackets 44 which are the furthest from stop 43 as illustrated in the accompanying figures was found more practical and more efficient for the pressure distribution. In any case, as an alternative or a complement to the illustrated embodiment, one or more guiding surfaces 35 could (also) be arranged so as to contact the backsides 45 of the two C-shaped brackets 44 the closest to stop 43.

Pivoting or tipping the cover 3 away from the vehicle windshield 5, i.e. along a tipping direction opposite to tipping direction D2, can then return the sensing device 2 and cover 3 of the sensor mounting system 1 in their respective delivery positions. However, since the sensor mounting system 1 of this embodiment comprises optional complementary third sensing device and cover locking means 26, 36, a disengagement of the cover 3 from the sensing device 2 can be prevented.

A subsequent step of the mounting kinematics will now be described with reference to FIGS. 4A and 4B. Upon pushing on the cover 3 along tipping direction D2, as mentioned above, the sensing device 2 can start sliding with respect to the vehicle sensor mounting bracket 4 along a sliding direction D3 of the Y axis, in particular away from stop 43. Here, the sensor mounting system 1 is illustrated in a phase where the sensing device 2 is partially slidably mounted in the vehicle sensor mounting bracket 4. In the present embodiment, this also corresponds to the mounting legs 25 partially slidably inserted in the C-shaped brackets 44. Furthermore, as also illustrated, the complementary second sensing device and cover locking means 27, 34 can now be partially engaged.

Figure 4A:
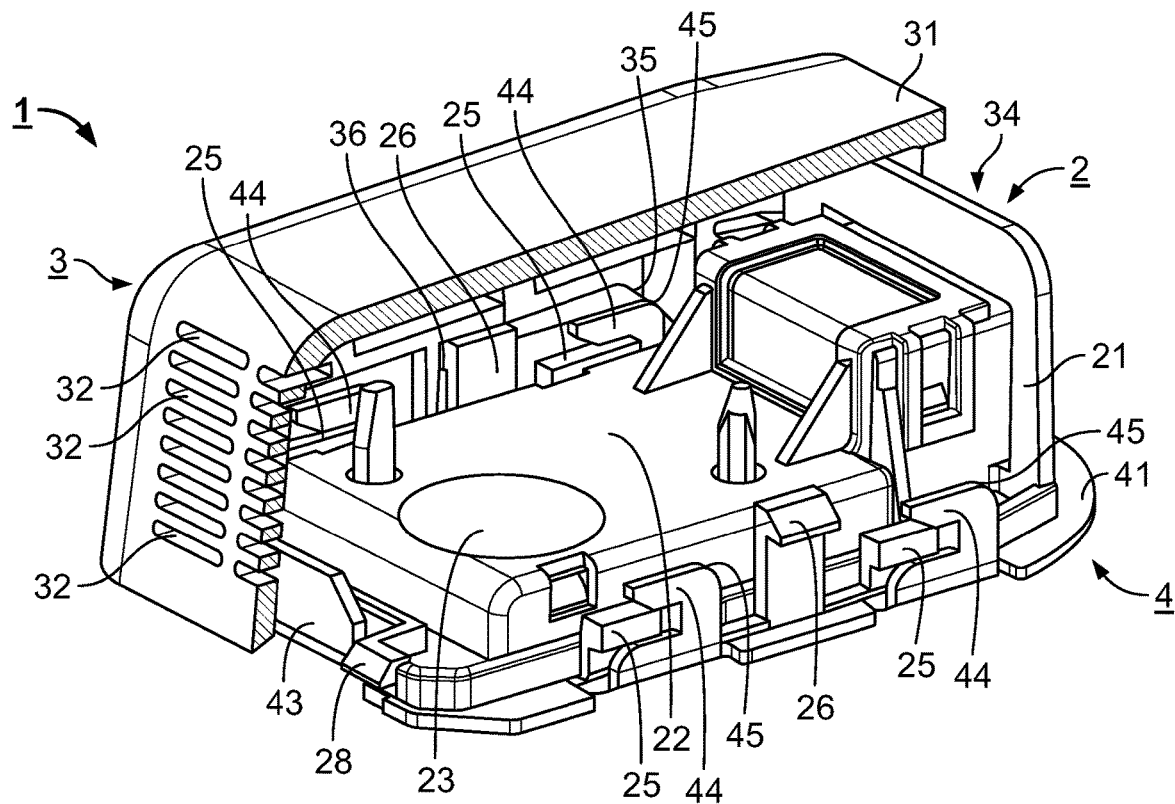
FIGS. 4A and 4B illustrate another subsequent step of the mounting kinematics of the exemplary sensor mounting system according to the present invention onto the customer vehicle sensor mounting bracket, both in a 3-D view (FIG. 4A) and in a simplified schematic cross-sectional view (FIG. 4B)
Figure 4B:
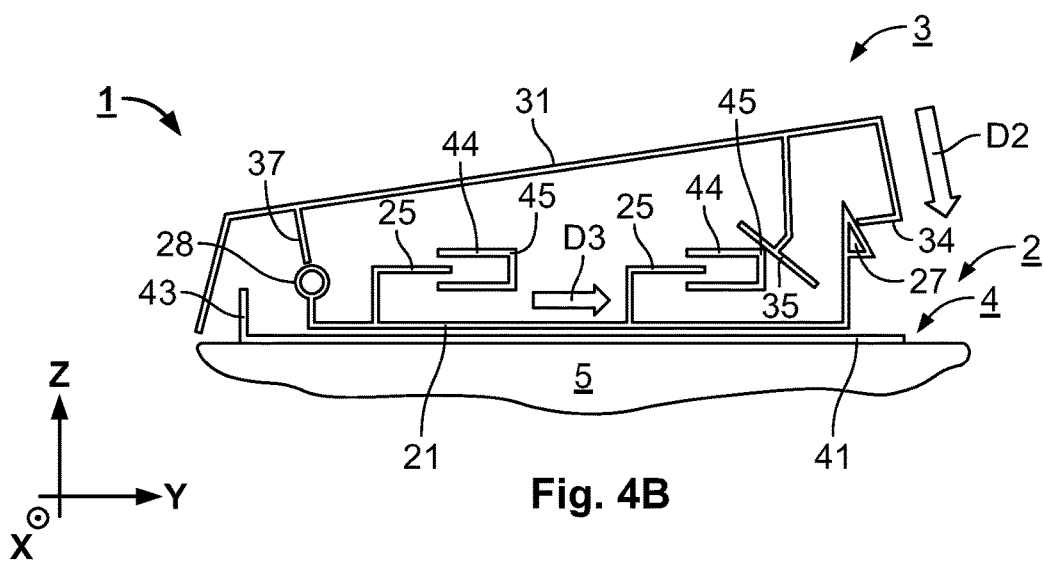

As also seen from FIGS. 4A and 4B, the guiding surfaces 35 can preferably be angled such that, upon pivoting or tipping the cover 3 along tipping direction D2, the guiding surfaces 35 will slide on the backside 45 of the respective C-shaped brackets 44, thereby causing the cover 3 to be displaced along sliding direction D3. Since the cover 3 is mounted together with the sensing device 2, the sensing device 2 will be dragged by the displacement of the cover 3 along sliding direction D3.

Since the complementary second sensing device and cover locking means 27, 34 are only partially engaged, pivoting or tipping the cover 3 away from the vehicle windshield 5 can return the sensing device 2 and cover 3 of the sensor mounting system 1 in their respective delivery positions as described in relation to the previous step.

Finally, a last step of the mounting kinematics will now be described with reference to FIGS. 5A and 5B. Continuing to pivot the cover 3 along tipping direction D2 will eventually result in locking of the sensor mounting system 1 with the vehicle sensor mounting bracket 4. In the present embodiment, the pressure exerted from the cover 3 to the vehicle sensor mounting bracket 4 continues causing the two guiding surfaces 35 to slide on the backside 45 of the respective C-shaped brackets 44 until the cover 3 has eventually reached the illustrated cover locked position. In the present embodiment, this corresponds to full engagement (locking) of the complementary second sensing device and cover locking means 27, 34. At the same time, the sensing device 2 eventually reaches the illustrated sensing device mounted position, wherein it is slid into its final position with the one or more sensors placed as required by the customer. In particular, when the sensing device 2 comprises a temperature sensor for sensing a temperature of the windshield 5, the windshield temperature sensor will have reached its intended position within the sensor accommodation space 42 of the vehicle sensor mounting bracket 4.

Figure 5A:
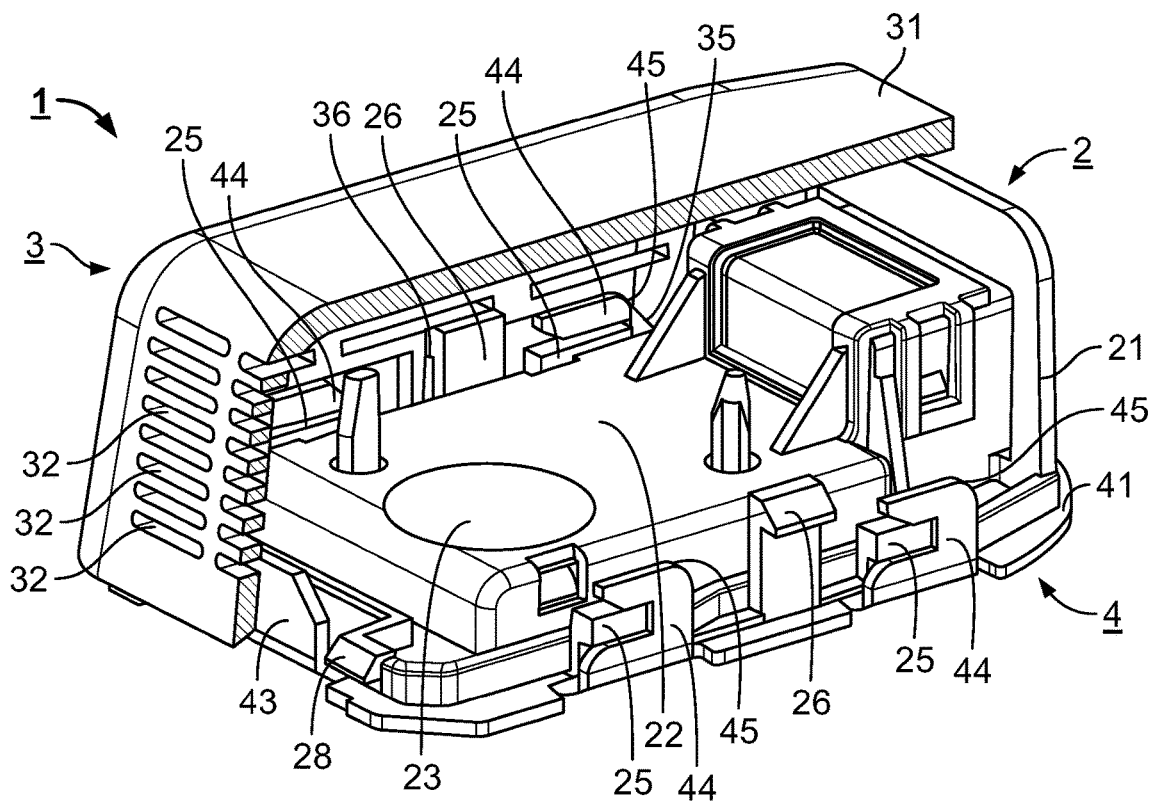
FIGS. 5A and 5B illustrate a final step of the mounting kinematics of the exemplary sensor mounting system according to the present invention onto the customer vehicle sensor mounting bracket, both in a 3-D view (FIG. 5A) and in a simplified schematic cross-sectional view (FIG. 5B).
Figure 5B:
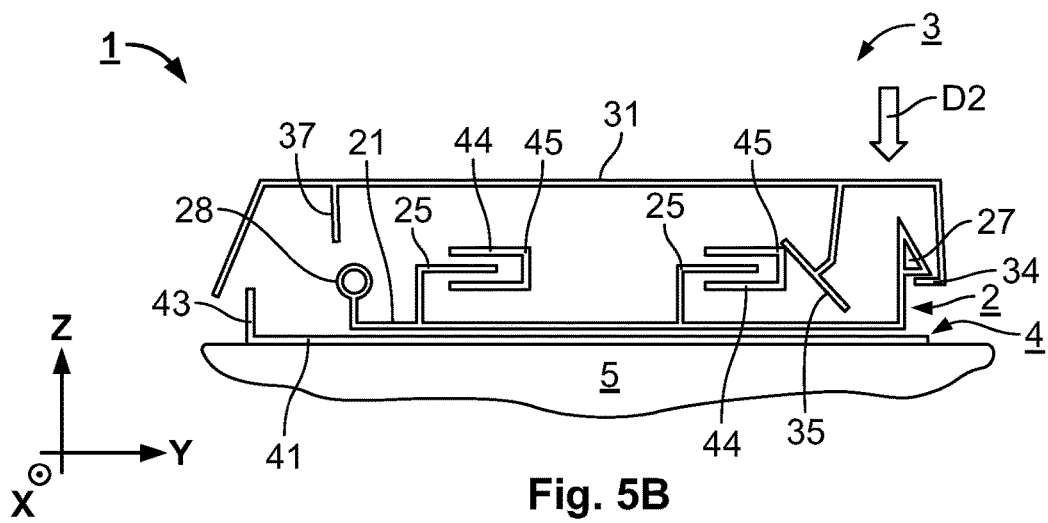

Furthermore, as can be seen from FIGS. 5A and 5B, when the sensing device 2 is in the sensing device mounted position, a relative displacement of the sensing device 2 and, hence, of the sensor mounting system 1 with respect to the vehicle sensor mounting bracket 4 along the Z axis is prevented. In other words, a displacement of the sensor mounting system 1 in a direction opposite to placement direction D1 is prevented. In the present embodiment, the sensing device mounted position also corresponds to the position for which the mounting legs 25 are correctly inserted in and in abutment with the C-shaped brackets 44.

Similarly, as can also be taken from FIGS. 5A and 5B, when the cover 3 is in the cover locked position, a relative displacement of the sensing device 2 and, hence, of the sensor mounting system 1 with respect to the vehicle sensor mounting bracket 4 along the Y axis is prevented. Furthermore, since the cover 3 is in the cover locked position and unintentional disengagement of the sensor mounting system 1 from the vehicle sensor mounting bracket 4 is prevented.

Although the mounting kinematics of the sensor mounting system 1 onto the vehicle sensor mounting bracket 4 has been explained using various steps with reference to FIGS. 2A-2B, 3A-3B, 4A-4B, and 5A-5B, it should be noted that once the sensor mounting system 1 is placed with the sensing device 2 and the cover 3 in their respective delivery positions on the vehicle sensor mounting bracket 4 as illustrated in FIGS. 2A and 2B, locking of the system can be reached with one single push on the cover 3. In other words, starting from the delivery positions illustrated in FIGS. 2A and 2B, a single and simple push action allows reaching the locked state of the system illustrated in FIGS. 5A and 5B.

Accordingly, the present invention provides a sensor and cover package solution for a customer-made vehicle sensor mounting bracket with advantageous applications in the automotive industry. As can be taken from the above, the present invention allows mounting and covering a sensor on a customer interface with only one push. Thus, the sensor mounting system of the present invention provides a simple mounting kinematics for a vehicle sensor mounting bracket attached to a vehicle windshield.

What is claimed is:

1. A sensor mounting system for mounting a sensor to a sensor mounting bracket, the system comprising:
   a sensing device positioned on the sensor mounting bracket and configured to slide from a sensing device delivery position to a sensing device mounted position; and
   a cover:
   (a) covering the sensing device,
   (b) mounted on the sensing device for pivotal movement relative to the sensing device from a cover delivery position to a cover locked position,
   (c) contacting the sensing device when pivoting from the cover delivery position to the cover locked position causing the sensing device to slide from the sensing device delivery position to the sensing device mounted position, and
   (d) in contact with the sensor mounting bracket when moved pivotally to the cover locked position.

2. The sensor mounting system according to claim 1, wherein the sensor mounting bracket has a bracket and the sensing device has a mounting leg slidably mounted in the bracket of the sensor mounting bracket.

3. The sensor mounting system according to claim 2, wherein the mounting leg is on a longitudinal side of the sensing device.

4. The sensor mounting system according to claim 3, wherein:
   (a) the cover has first cover locking means towards a first extremity of the cover;
   (b) the sensing device has first sensing device locking means towards a first extremity of the sensing device; and
   (c) the first cover locking means and the first sensing device locking means are one pivot point.

5. The sensor mounting system according to claim 4, wherein:
  (a) the cover has a second cover locking means opposite the first cover locking means;
  (b) the sensing device has a second sensing device locking means opposite the first sensing device locking means; and
  (c) upon pivoting the cover relative to the sensing device into the cover locked position, the second cover locking means engage the second sensing device locking means, thereby locking the cover to the sensing device.

6. The sensor mounting system according to claim 5, wherein:
  (a) the cover has third cover locking means between the first cover locking means and the second cover locking means;
  (b) the sensing device has third sensing device locking means between the first sensing device locking means and second sensing device locking means; and
  (c) upon pivoting the cover relative to the sensing device towards the cover delivery position, the third cover locking means engage the third sensing device locking means, thereby preventing a disengagement of the cover from the sensing device.

7. The sensor mounting system according to claim 6, wherein the cover has at least one guiding surface arranged such that, when the sensing device is mounted onto the sensor mounting bracket in the sensing device delivery position with the cover in the cover delivery position, the guiding surface contacts the sensor mounting bracket on a respective contact surface such that by pivoting the cover towards the cover locked position, the guiding surface exerts a pressure on the corresponding contact surface causing sliding of the sensing device into the sensing device mounted position.

8. The sensor mounting system according to claim 7, wherein, when the sensing device is mounted onto the sensor mounting bracket in the sensing device mounted position and the cover is in the cover locked position, the guiding surface is in abutment against the corresponding contact surface, thereby preventing sliding of the sensing device back towards the sliding device delivery position.

9. The sensor mounting system according to claim 7, wherein the guiding surface is arranged on a longitudinal side of the cover.

10. The sensor mounting system according to claim 7, wherein the cover has two guiding surfaces on opposite sides thereof.

11. The sensor mounting system according to claim 7, wherein the contact surface is a backside of a bracket of the sensor mounting bracket.

12. The sensor mounting system according to claim 7, wherein the sensing device is placed in the sensing device delivery position on the sensor mounting bracket along a sensing device placement direction which is substantially perpendicular to a sliding direction for sliding the sensing device from the sensing device delivery position into the sensing device mounted position.

13. The sensor mounting system according to claim 7, wherein the sensing device has at least one temperature sensor and/or at least one humidity sensor and/or at least one filter.

14. The sensor mounting system according to claim 7, wherein the cover has means for allowing air circulation on the sensing device.

15. The sensor mounting system according to claim 2, wherein the mounting leg is mounted in the bracket in the sensing device mounted position.

16. The sensor mounting system according to claim 15, wherein the mounting leg is spaced apart from the bracket in the sensing device delivery position.

17. The sensor mounting system according to claim 16, wherein the mounting leg does not engage the bracket in the sensing device delivery position.

18. The sensor mounting system according to claim 1, wherein the sensing device has four mounting legs arranged two by two on opposite sides of the sensing device.

19. A method for mounting a sensor comprising the steps of:
  providing a sensor mounting bracket;
  attaching the sensor mounting bracket to a surface;
  providing a sensor mounting system to be mounted to the sensor mounting bracket and comprising:
  (a) a sensing device slidable from a sensing device delivery position to a sensing device mounted position, and
  (b) a cover:
    (1) mounted on the sensing device for movement relative to the sensing device from a cover delivery position to a cover locked position,
    (2) contacting the sensing device when moving from the cover delivery position to the cover locked position causing the sensing device to slide from the sensing device delivery position to the sensing device mounted position, and
    (3) in contact with the sensor mounting bracket when moved pivotally to the cover locked position;
  positioning the sensing device on the sensor mounting bracket;
  pushing the cover against the sensing device to slide the sensing device from the sensing device delivery position to the sensing device mounted position.

20. The method for mounting a sensor according to claim 19, wherein the cover movement is pivotal.

* * * * *